A. SHEEK.

Millstone Dress.

No. 22,831.

Patented Feb. 1, 1859.

WITNESSES
A. B. Stoughton
E. Cohen

INVENTOR
A. Sheek

UNITED STATES PATENT OFFICE.

ALBERT SHEEK, OF SOUTH GROVE, NORTH CAROLINA.

DRESSING MILLSTONES.

Specification of Letters Patent No. 22,831, dated February 1, 1859.

*To all whom it may concern:*

Be it known that I, ALBERT SHEEK, of South Grove, in the county of Davie and State of North Carolina, have invented a new and useful Improvement in the Dress of Millstones; and I do hereby declare the following to be a full, clear, and exact description of the same, reference being had to the accompanying drawings, making a part of this specification, in which—

Figure 1:
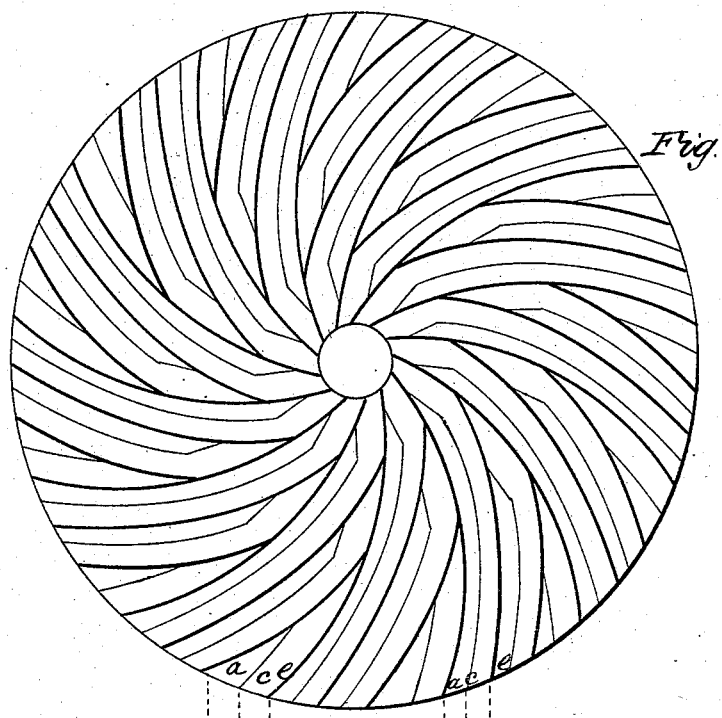
Figure 2:
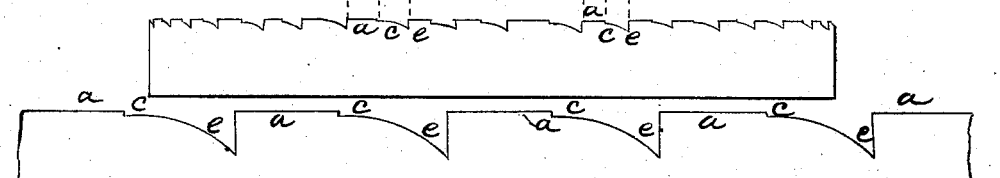
Figure 3:
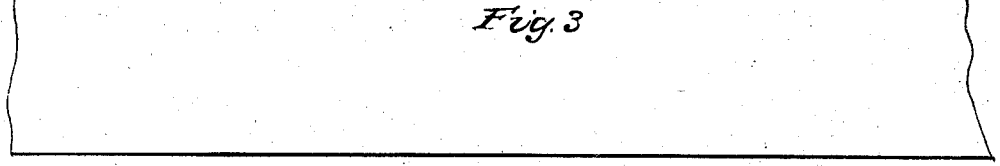

Figure 1 represents the bed of a mill stone, or its grinding surface. Fig. 2, represents an elevation of the same. Fig. 3, represents on an enlarged scale a spread out or elongated elevation to better show the form of the dress.

Similar letters of reference where they occur in the separate figures denote like parts of the dress in all of them.

I am aware that, the feathered edges, or corners of the grooves in millstones have been rounded off or rubbed down by a bur block, or other stones and I am also aware that, the surfaces of the grooves have been made, in most instances straight, and in some instances concave. I do not claim any or either of these things.

The nature of my invention consists in making a slight shoulder or depression where the "land," and "furrow" unite, and making the furrow convex from that point, to where it unites with the shoulder of the next land, the object being to crack or crush the grains between the two convex surfaces of the runner and bed, preparatory to its being ground or reduced, at the slight shoulders formed where the furrows join the lands.

To enable others skilled in the art to make and use my invention, I will proceed to describe the same with reference to the drawings.

My invention is not confined to any specific outline of land and furrow, or to the filling up between the eye and the skirt of the stone, as this may be varied to suit the user. But, in Fig. 1, I have shown a form of filling up which I have found in practice to answer an admirable purpose. In this figure as well as Figs. 2 and 3, $a$ represents the lands; $c$, the shoulder or depression, and $e$ the bottom of the furrow. From $a$, to $c$, the lands are horizontal, and from $c$, to $e$ the furrow is convex, and may form the arc of a true circle. When the bed stone and runner are thus dressed, and laid together face to face, and the latter put in motion the furrows cross each other shear fashion. The grains carried outward from the eye, in the furrows are first cracked between the convex surfaces, which releases the farinaceous matter from the hulls, without cutting the hulls. And when this farinaceous matter reaches the depression ($c$), it is ground into flour, and completed without having any ground particles of the hulls in it as they were previously separated from the meal portion by cracking, and will pass the depressions without being reduced to fine stuff. When the hull is ground with the meal, or at the same time, the former mixes with the latter, making it dark, and besides the hulls carry off much of the meal, that cannot be separated from them when that is done. I thus make a better article, and a greater percentage of flour, than by any other known dress.

Having thus fully described the nature and object of my invention what I claim therein as new, and desire to secure by Letters Patent is,

In combination with a plain surfaced land $a$, the depression $c$, and convex furrow or surface from $c$, to $e$ the whole forming a new mill dress, for the purpose, and in the manner described.

A. SHEEK.

Witnesses:
 A. B. STOUGHTON,
 E. COHEN.